Jan. 20, 1953   R. M. LEIPPE   2,626,297
TORQUE BALANCING ADJUSTER FOR ELECTRICAL METERS
Filed April 8, 1948
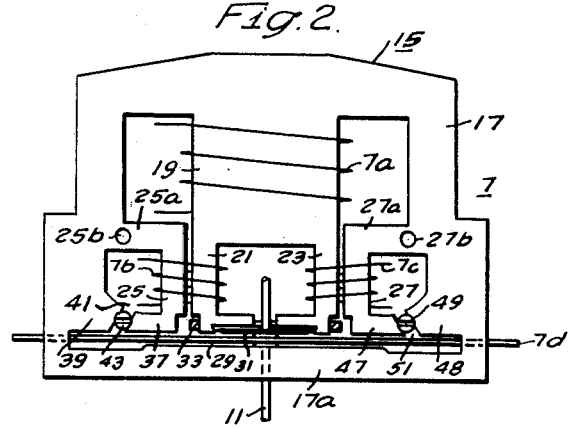
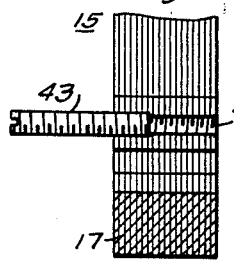
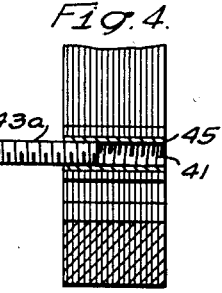
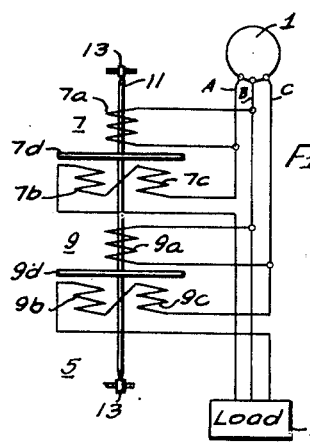
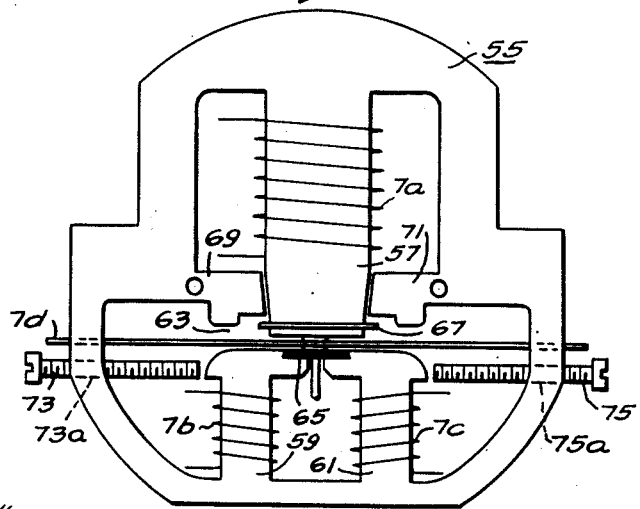
WITNESSES:
E. A. M'Blakey.
Leon M. Garman
INVENTOR
Richard M. Leippe.
BY C. L. Friedman
ATTORNEY Patented Jan. 20, 1953

2,626,297

UNITED STATES PATENT OFFICE 2,626,297

TORQUE BALANCING ADJUSTER FOR ELECTRICAL METERS

Richard M. Leippe, Cedar Grove, N. J., assignor to Westinghouse Electric Corporation, East Pittsburgh, Pa., a corporation of Pennsylvania Application April 8, 1948, Serial No. 19,818

7 Claims. (Cl. 171—264)

This invention relates to electrical measuring devices, and it has particular relation to a plural-element electrical meter having improved facilities for adjusting the balance between the elements of the meter.

In measuring various electrical quantities, such as the real or reactive power or energy of a three-wire single-phase or a polyphase electrical circuit, it is common practice to employ a plural-element measuring device. For example, in measuring the electrical energy supplied to a load by a three-phase, three-wire alternating-current circuit, a two-element watthour meter may be employed. For this watthour meter to measure accurately the desired quantity, it is important that the two elements be accurately balanced. Prior art torque or phase balancing devices have not been entirely satisfactory for the reason that adjustment thereof modifies the meter characteristics to a substantial extent. For example, adjustment of prior art balancing devices generally results in a substantial shift in the absolute power factor calibration of the element so adjusted.

In accordance with the invention, a balancing device for a plural-element meter cooperates with the series or current poles of one or more of the elements. In a preferred embodiment of the invention, a separate, adjustable magnetic member is provided for each of the current poles. The magnetic members establish adjustable magnetic paths which direct current magnetic flux away from the airgap of the element. If two pairs of current poles are available in the element, a conventional load shunt may be associated with one pair of the current poles, whereas, the balancing members are associated with the remaining pairs of the current poles.

It is, therefore, an object of the invention to provide improved balancing mechanism for a plural-element measuring device.

It is also an object of the invention to provide improved balancing mechanism for a plural-element meter which operates primarily on current magnetic flux.

It is a further object of the invention to provide a meter element having two current poles and a separate magnetic adjustable balancing member associated with each of the current poles.

It is a still further object of the invention to provide a meter element for a plural meter having two pairs of current poles wherein a load compensating shunt is associated with one pair of current poles and magnetic adjustable balancing members are associated with the remaining pair of current poles.

Other objects of the invention will be apparent from the following description taken in conjunction with the accompanying drawing, in which:

Figure 1 is a schematic view of an electrical system having a two-element meter associated therewith;

Fig. 2 is a view in side elevation, with parts broken away, of a meter element suitable for the meter of Fig. 1;

Figs. 3 and 4 are detail views in section showing two modifications of an adjustable screw device suitable for the meter element of Fig. 2; and Fig. 5 is a view in side elevation, with parts broken away, of a modified meter element suitable for the meter of Fig. 1.

Referring to the drawing, Fig. 1 shows an electrical system including a generator 1 for supplying electrical energy to a load 3. The system may be a three-wire, single-phase system or a polyphase alternating-current system. For the purpose of discussion, it will be assumed that the system is a three-phase, three-wire alternating current system operating at a frequency of 60 cycles per second. The generator 1 supplies energy to the load 3 through phase conductors A, B and C.

For measuring the electrical energy supplied to the load 3, a meter 5 is associated with the system. This meter includes two meter elements 7 and 9 which are associated with a common shaft 11. The meter element 7 includes a voltage winding 7a, current windings 7b and 7c, and an electroconductive armature or disc 7d. Similarly, the meter element 9 includes a voltage winding 9a, current windings 9b and 9c, and an electroconductive armature or disc 9d. The two armatures are mounted on the shaft 11 which, in turn, is mounted for rotation with respect to the windings by means of suitable bearings 13. It will be understood that the meter 5 includes conventional damping magnets and registers or recording elements for measuring the desired quantity.

Measurement of the energy supplied by the generator 1 to the load 3 may be effected by connecting the voltage winding 7a for energization in accordance with the voltage between the phase conductors A and B. The current windings 7b and 7c are connected in series for energization in accordance with current flowing in the phase conductor A. The voltage winding 9a is connected for energization in accordance with the voltage between the phase conductors B and C. The current windings 9b and 9c are connected in series for energization in accordance with the current flowing in the phase conductor C. If the polarities are properly selected, the two-element meter 5 measures electrical energy supplied by the generator 1 to the load 3.

The meter element 7 is shown in greater detail in Fig. 2. It will be observed that the meter element includes a magnetic structure 15 having a continuous rim portion 17. The magnetic structure 15 also includes a voltage pole 19 which projects inwardly from the rim portion. The end of the voltage pole is bifurcated to provide two inner current poles 21 and 23. In addition, two outer current poles 25 and 27 project inwardly from the rim portion. It will be observed that the four current poles are spaced from a section 17a of the rim portion to establish an airgap 29 therebetween. The armature 7d has a part positioned within the airgap for rotation therethrough.

It will be observed that the voltage pole is surrounded by the voltage winding 7a and that this winding, when energized, directs voltage magnetic flux through the poles 21 and 23 in parallel into the airgap 29. The current poles 21 and 25 both are surrounded by the current winding 7b. The winding 7c surrounds the two current poles 23 and 27.

A conventional magnetic shunt 31 is positioned between the inner current pole pieces 21 and 23. In addition, a conventional quadrature or lag loop 33 surrounds the tips of the poles 21 and 23 for the purpose of establishing the desired phase relationship between the current and voltage magnetic fluxes.

It will be observed that the poles 25 and 27 are connected to the rim portion through voltage control arms 25a and 27a, respectively. These arms have openings 25b and 27b therethrough for the purpose of reducing the cross-sections of the arms. As well understood in the art, these arms are designed to saturate within the range of probable variation of voltage applied to the voltage winding 7a for the purpose of improving the accuracy of the meter element under conditions of varying voltage.

The portions of Fig. 2 thus far specifically mentioned are well known in the art and may be employed in both of the meter elements 7 and 9 of Fig. 1. However, as previously pointed out, at least one of these elements should have provision for balancing the elements. For example, in Fig. 2, a magnetic screw may be positioned to bridge to an adjustable extent the gap between the tips of the current poles 21 and 23. However, such a location of the screw would have an appreciable effect on the performance of the load compensating shunt 31 and on the performance of the quadrature loop 33.

In order to provide balancing mechanism having a minimum effect on the other meter characteristics, the current pole 25 and the rim portion 17 are provided with extensions 37 and 39 which are spaced to define an opening 41. This opening has opposed arcuate surfaces which are threaded for reception of a balancing screw 43. Consequently, rotation of the screw 43 advances the screw into the opening or retracts it from the opening to any desired degree. It will be observed that the extensions 37 and 39, together with the screw 43, define a magnetic path for diverting magnetic flux produced by the current winding 7b away from the airgap 29. The proportion of the magnetic flux thus diverted may be adjusted as desired by rotation of the balancing screw 43. The spacing between the extensions may be selected from a substantial range. For example, the spacing may be of the order of the length of the airgap 29 or longer.

The sensitivity of the balancing screw 43 may be selected as desired by selecting materials for the screw having suitable magnetic permeability. The greater the magnetic permeability of the screw, the more sensitive will be the meter element to rotation of the screw. Alternatively, the opening 41 may be lined with a non-magnetic sleeve 45, as shown in Fig. 4. The sleeve is threaded for reception of a balancing screw 43a which is constructed of a material having substantial magnetic permeability. Because of the presence of the non-magnetic sleeve 45, the meter element is less sensitive to adjustment of the magnetic screw 43a of Fig. 4, than to the adjustment of the magnetic screw of Figs. 2 and 3.

In a similar manner, the current pole 27 and the rim portion may be provided with extensions 47 and 48 which are spaced to define an opening 51. A magnetic screw 49 is disposed in this opening in the manner discussed with reference to the magnetic screw 43.

In adjusting the balance of a meter, it is desirable that the balancing screws 43 and 49 both be advanced or retracted in substantially equal degrees. However, it has been found that a small variation in the degrees of movement of the screws does not seriously affect the accuracy of the meter. Although balancing screws may be provided in both of the meter elements, it suffices to employ them in only one of the meter elements.

By reference to Fig. 2, it will be observed that the conventional overload magnetic shunt 31 operates on the inner current poles 21 and 23, whereas, the balancing screws 43 and 49 affect predominately, magnetic flux flowing through the outer current poles 25 and 27. For this reason, adjustment of the balancing screws does not materially affect the load compensation introduced by the shunt 31. For similar reasons, adjustment of the balancing screws does not materially affect the phase displacement established by the quadrature loop 33.

It will be observed that with respect to the voltage magnetic flux the balancing screws 43 and 49 establish magnetic paths which are substantially in parallel with the arms 25a and 27a. However, it has been found that the range of adjustment required for the balancing screws 43 and 49 does not change the voltage curve of the meter element to an objectionable degree.

The adjustment of the two elements of a two-element meter for balance is well understood in the art. It will be appreciated that in a meter embodying the invention, the balancing screws 43 and 49 associated with one of the meter elements may be advanced or retracted together until when equally energized, the two elements apply equal torques to the shaft 11.

In Fig. 5, a modified version of the invention is illustrated. In this version, a magnetic structure 55 is provided which includes a voltage pole 57 and two current poles 59 and 61. The poles are spaced to define an airgap 63 within which a part of the armature 7d may be positioned for rotation. The voltage pole 57 is surrounded by the voltage winding 7a, whereas, the current poles are surrounded by the current windings 7b and 7c, respectively. A load compensating magnetic shunt 65 extends between the current pole pieces 59 and 61 adjacent the pole faces thereof. A quadrature loop 67 surrounds the voltage pole 57 adjacent the pole face thereof. In addition, conventional voltage control sections 69 and 71 project from the rim portion of the magnetic structure 55 towards the voltage pole 57 adjacent the quadrature loop. The parts of Fig. 5 thus far specifically mentioned are conventional in the art.

In order to balance a plural-element meter employing elements similar to that illustrated in Fig. 5, two balancing screws 73 and 75 are provided. These screws pass through threaded openings 73a and 75a in the rim portion of the magnetic structure 55 towards the current poles 59 and 61, respectively, adjacent the pole faces of the current poles. It will be observed that the balancing screw 73, which is made of soft magnetic material, diverts current magnetic flux away from the airgap 63. In a similar manner, the balancing member 75 cooperates with the current pole 61 to divert magnetic flux away from the airgap. Consequently, by adjustment of the screws with respect to the tips of the current poles 59 and 61, the torque applied to the disc 7d by the meter element of Fig. 5 may be adjusted within a suitable range of adjustment. Consequently, if the two-element meter of Fig. 1 employs meter elements of the type illustrated in Fig. 5, the balancing screws 73 and 75 may be actuated for the purpose of balancing the two elements of the meter.

The balancing screws of Figs. 2 and 5 operate essentially on the current or series magnetic flux. Adjustments thereof result in substantially less change in meter characteristics, and particularly in power factor calibration, than the corresponding changes encountered in adjustment of conventional prior art balancing devices. When the adjustments vary voltage or shunt magnetic flux changes in lagging or power factor calibration and voltage compensation result.

Although the invention has been described with respect to certain specific embodiments thereof, numerous modifications falling within the spirit and scope of the invention are possible.

I claim as my invention:

1. In an electrical meter, a magnetic structure having an airgap, an armature disposed for rotation in the airgap, said magnetic structure including a voltage pole and a pair of current poles, a winding associated with each of said poles, each of the current poles having only one winding, said windings when suitably energized producing a shifting magnetic field in the airgap, and separate, adjustable magnetic means positioned adjacent the pole face of each of the current poles for diverting magnetic flux produced by windings on the current poles away from the airgap.

2. In an electrical meter, a magnetic unit comprising a substantially continuous magnetic rim portion having a magnetic voltage pole and magnetic current poles projecting inwardly from the rim portion to establish an airgap bordered by the pole faces of said poles, a voltage winding for the voltage pole, a separate current winding for each of the current poles, each of the current poles having only one current winding, said windings when suitably energized establishing a shifting magnetic field in the airgap, an electroconductive armature mounted for rotation in the airgap, and a separate magnetic structure extending from each of the current poles adjacent the pole face thereof towards the rim portion, each of said magnetic structures comprising means for adjusting the magnetic reluctance of the magnetic path established by the magnetic structure between the associated pole face and the rim portion.

3. A meter as specified in claim 2 wherein each of the magnetic structures comprises a magnetic screw in threaded engagement with the rim portion, each of the screws projecting from the rim portion towards the associated pole face.

4. In an electrical measuring device, a magnetic structure comprising a magnetic member and four pole pieces positioned substantially in a common plane, said pole pieces having pole faces disposed substantially in a common plane spaced from the magnetic member to define an airgap therebetween, voltage winding means cooperating with the magnetic structure for directing, when energized in accordance with the voltage of a circuit, a voltage magnetic flux through the two inner pole pieces in parallel and the airgap, current winding means effective, when energized in accordance with the current of a circuit, for directing current magnetic flux between each of the outer pole pieces and the adjacent one of the inner pole pieces in parallel and the airgap, a first magnetic shunt extending between the inner pole pieces for directing current magnetic flux away from the airgap, and magnetic diverting means spaced from the inner pole pieces and extending from the outer pole pieces for directing current magnetic flux away from the airgap, said magnetic diverting means being adjustable for varying the proportion of current magnetic flux diverted away from the airgap.

5. In an electrical measuring device, a magnetic structure comprising a continuous magnetic rim portion and four pole pieces projecting inwardly from the rim portion and positioned substantially in a common plane, said pole pieces having pole faces disposed substantially in a common plane spaced from the continuous magnetic rim portion to define an airgap therebetween, voltage winding means cooperating with the magnetic structure for directing, when energized in accordance with the voltage of a circuit, a voltage magnetic flux through the two inner pole pieces in parallel and the airgap, current winding means effective, when energized in accordance with the current of a circuit, for directing current magnetic flux between each of the outer pole pieces and the adjacent one of the inner pole pieces in parallel and the airgap, a first magnetic shunt extending between the inner pole pieces for directing current magnetic flux away from the airgap, and magnetic-path-defining means including a separate magnetic screw extending between each of the outer pole pieces adjacent the pole face thereof and the rim portion, said screws being adjustable in a direction transverse to said common plane for adjusting the magnetic reluctances of the magnetic paths defined by the last-named means.

6. In a plural-element electric meter, a shaft; a plurality of meter elements each effective when energized for applying a torque to said shaft; means mounting the shaft for rotation relative to the meter elements; each of said meter elements comprising a magnetic structure having an air-gap, said magnetic structure including a voltage pole and current poles, voltage and current windings associated with the voltage and current poles respectively for producing when suitably energized a shifting magnetic field in the airgap, and an electroconductive armature disposed in the airgap, said armature being secured to the shaft; and balancing means for adjusting the torque developed by at least one of the meter elements, said balancing means comprising a separate magnetic extension cooperating with each of two current poles of one of the magnetic structures for establishing a pair of magnetic paths for current magnetic flux displaced from the airgap of the last-named magnetic structure, said balancing means including means for adjusting the magnetic reluctance of each of said magnetic paths.

7. In an electrical meter, a magnetic unit comprising a substantially continuous magnetic rim portion having a magnetic voltage pole and magnetic current poles projecting inwardly from the rim portion to establish an airgap bordered by the pole faces of said poles, a voltage winding for the voltage pole, a separate current winding for each of the current poles, each of the current poles having only one current winding, said windings when suitably energized establishing a shifting magnetic field in the airgap, an electroconductive armature mounted for rotation in the airgap, a separate magnetic structure extending from each of the current poles adjacent the pole face thereof towards the rim portion, each of said magnetic structures comprising means for adjusting the magnetic reluctance of the magnetic path established by the magnetic structure between the associated pole face and the rim portion, and a magnetic shunt extending between the current pole pieces adjacent the current pole faces.

RICHARD M. LIEPPE.

REFERENCES CITED

The following references are of record in the file of this patent:

UNITED STATES PATENTS

| Number | Name | Date |
| --- | --- | --- |
| 1,469,558 | Harris | Oct. 2, 1923 |
| 1,566,902 | Ciffrinowitsch | Dec. 22, 1925 |
| 1,778,835 | Rutter | Oct. 21, 1930 |
| 2,119,015 | Kurz | May 31, 1938 |
| 2,160,416 | Green | May 30, 1939 |
| 2,349,242 | Barnes | May 23, 1944 |

FOREIGN PATENTS

| Number | Country | Date |
| --- | --- | --- |
| 395,288 | Germany | May 8, 1924 |